(12) United States Patent
Horio et al.

(10) Patent No.: US 10,564,324 B2
(45) Date of Patent: Feb. 18, 2020

(54) OPTICAL LAYERED BODY

(71) Applicants: Dai Nippon Printing Co., Ltd., Tokyo (JP); Dexerials Corporation, Tokyo (JP)

(72) Inventors: Tomoyuki Horio, Tokyo (JP); Masataka Nakashima, Tokyo (JP); Hiroshi Nakamura, Tokyo (JP); Takahisa Nomura, Tokyo (JP); Seiji Shinohara, Tokyo (JP); Kiyotaka Matsui, Tokyo (JP); Kentaro Oshima, Tokyo (JP); Satoshi Kuboyama, Tokyo (JP); Yukihiro Ono, Tokyo (JP)

(73) Assignees: Dai Nippon Printing Co., Ltd., Tokyo (JP); DEXERIALS Corporation, Tokyo (JP)

( * ) Notice: Subject to any disclaimer, the term of this patent is extended or adjusted under 35 U.S.C. 154(b) by 0 days.

(21) Appl. No.: 16/317,388

(22) PCT Filed: Jul. 10, 2017

(86) PCT No.: PCT/JP2017/025166
§ 371 (c)(1),
(2) Date: Jan. 11, 2019

(87) PCT Pub. No.: WO2018/012464
PCT Pub. Date: Jan. 18, 2018

(65) Prior Publication Data
US 2019/0227195 A1 Jul. 25, 2019

(30) Foreign Application Priority Data
Jul. 13, 2016 (JP) .................................. 2016-138984

(51) Int. Cl.
G02B 1/115 (2015.01)
G02B 1/14 (2015.01)
G02B 5/00 (2006.01)

(52) U.S. Cl.
CPC ................ *G02B 1/115* (2013.01); *G02B 1/14* (2015.01); *G02B 5/003* (2013.01)

(58) Field of Classification Search
CPC .......... G02B 1/115; G02B 5/003; G02B 1/14; B32B 27/20; B32B 27/18; B32B 2310/14;
(Continued)

(56) References Cited

U.S. PATENT DOCUMENTS

2010/0104879 A1* 4/2010 Okano ................... G02B 1/105
428/447
2010/0167068 A1* 7/2010 Horio ...................... G02B 1/04
428/448

(Continued)

FOREIGN PATENT DOCUMENTS

JP 2003-329805 11/2003
JP 2005-017707 1/2005
(Continued)

*Primary Examiner* — Nathan L Van Sell
(74) *Attorney, Agent, or Firm* — Hamre, Schumann, Mueller & Larson, P.C.

(57) ABSTRACT

The present invention aims to provide an optical layered body that has excellent interlayer adhesiveness, particularly even in outdoor use, and also has highly excellent anti-blocking properties. The present invention relates to an optical layered body including: a substrate film; a hard coat layer containing silica fine particles on at least one surface of the substrate film; and a dry film layer on a surface of the hard coat layer opposite to the substrate film side surface of the hard coat layer, wherein the silica fine particles are exposed on the dry film layer side surface of the hard coat layer; the dry film layer is directly formed on the surface of the hard coat layer on which the silica fine particles are (Continued)

(A)

(B)

exposed; the hard coat layer before the formation of the dry film layer has projections and depressions on the surface on which the dry film layer is to be formed; the hard coat layer has an average silica fine particle abundance in ten 0.2 µm×0.2 µm regions of 30 to 80% and a standard deviation of silica fine particle abundances in the 10 regions of 1 to 7, where the 10 regions are randomly selected from a cross section of the hard coat layer in the thickness direction within the range from the dry film layer side interface to 10% of the thickness in the thickness direction; and the hard coat layer has a silicon atom abundance A of 2 to 10% on the surface opposite to the substrate film side surface as determined by X-ray photoelectron spectroscopy.

6 Claims, 2 Drawing Sheets

(58) Field of Classification Search
CPC ............ B32B 2255/10; B32B 2255/20; B32B 2255/28; B32B 2307/538; B32B 2307/418; B32B 23/20; B32B 23/08; B32B 7/023
See application file for complete search history.

(56) References Cited

U.S. PATENT DOCUMENTS

| 2017/0131439 A1 | 5/2017 | Kobori et al. |
| 2017/0139084 A1 | 5/2017 | Shimada |

FOREIGN PATENT DOCUMENTS

| JP | 2006-023904 | 1/2006 |
| WO | 2015/163465 | 10/2015 |
| WO | 2016/003179 | 1/2016 |

* cited by examiner (A)    (B)

OPTICAL LAYERED BODY

TECHNICAL FIELD

The present invention relates to optical layered bodies.

BACKGROUND ART

In image display devices such as liquid crystal displays (LCDs), electroluminescence displays (ELDs), field emission displays (FEDs), electric paper, tablet PCs, plasma displays (PDPs), and cathode ray tube displays (CRTs) and in pointing devices such as touch panels, the image display screen is required to reduce reflection of light from external light sources to increase its visibility. An optical layered body in which a hard coat layer and an anti-reflection layer are formed on a light-transmitting substrate is commonly used to reduce reflection on the image display screen and improve the visibility.

A known anti-reflection layer, for example, includes alternating low refractive index layers and high refractive index layers stacked by sputtering or the like on a hard coat layer. The low refractive index layers have a lower refractive index than the hard coat layer and the high refractive index layers have a higher refractive index than the low refractive index layers (see, for example, Patent Literature 1).

In a common image display device including an anti-reflection layer, a hard coat layer and an anti-reflection layer are formed on a light-transmitting substrate, and the light-transmitting substrate is attached to the outermost surface of the image display device.

Production of an optical layered body including such an anti-reflection layer involves formation of a two-layer coating including a low refractive index layer and a high refractive index layer on a hard coat layer. Recent image display devices need three or four or more layers because of demand for a higher anti-reflection function.

Imparting such an anti-reflection function requires repeated sequential coating to stack the low refractive index layer and the high refractive index layer on the hard coat layer.

When the layered body obtained by forming an anti-reflection layer on a hard coat layer is used in an image display device, importance is placed also on the adhesiveness between the hard coat layer, which is mainly made of an organic resin component, and the anti-reflection layer (sputtered layer), which is made of an inorganic component. Techniques thus have been devised for improving the adhesiveness. Known techniques include, for example, a technique of mixing the inorganic component of the anti-reflection layer (sputtered layer) into the resin component of the hard coat layer to improve the adhesiveness, and a technique of forming a SiOx layer as a primer between the hard coat layer and the anti-reflection layer.

The image display devices, however, are being increasingly used outdoors these days, and when the optical layered body is exposed to ultraviolet light outdoors, separation is most likely to occur at the interface between the organic material and the inorganic material. Conventional optical layered bodies thus are disadvantageously susceptible to separation of layers, particularly at the interface between the hard coat layer and the anti-reflection layer.

Since watching various videos is common these days, not only portable tablet PCs but also laptop PCs, which are usually used on a desk or table, are required to provide clearer images. Thus, instead of imparting anti-glare properties as an anti-reflection function, a layered body of a glass-like, clear hard coat layer and an anti-reflection layer is being increasingly used. Such a clear hard coat layer has a smooth outermost surface, so that it has a problem in the surface slipperiness and has poor anti-blocking properties.

The anti-blocking properties affect the ease of winding of the hard coat layer having a smooth surface into a roll and the ease of unwinding during conventionally known polarizing plate processing. In addition, when the anti-reflection layer (inorganic anti-reflection layer) is formed on the hard coat layer by roll-to-roll sputtering or the like in the subsequent step, it is important that the anti-blocking properties are at a level that allows smooth processing even in a vacuum environment.

In a vacuum environment, however, blocking is far more likely to occur than in an atmospheric environment. Layered bodies with a conventional hard coat layer are thus hardly sufficient in anti-blocking properties.

CITATION LIST

Patent Literature

Patent Literature 1: JP 2006-23904 A

SUMMARY OF INVENTION

Technical Problem

In view of the situation in the art, the present invention aims to provide an optical layered body that has excellent interlayer adhesiveness, particularly even in outdoor use, and also has highly excellent anti-blocking properties.

Solution to Problem

The present invention is directed to an optical layered body including: a substrate film; a hard coat layer containing silica fine particles on at least one surface of the substrate film; and a dry film layer on a surface of the hard coat layer opposite to the substrate film side surface of the hard coat layer, wherein the silica fine particles are exposed on the dry film layer side surface of the hard coat layer; the dry film layer is directly formed on the surface of the hard coat layer on which the silica fine particles are exposed; the hard coat layer before the formation of the dry film layer has projections and depressions on the surface on which the dry film layer is to be formed; the hard coat layer has an average silica fine particle abundance in ten 0.2 μm×0.2 μm regions of 30 to 80% and a standard deviation of silica fine particle abundances in the 10 regions of 1 to 7, where the 10 regions are randomly selected from a cross section of the hard coat layer in the thickness direction within the range from the dry film layer side interface to 10% of the thickness in the thickness direction; and the hard coat layer has a silicon atom abundance A of 3 to 10% on the surface opposite to the substrate film side surface as determined by X-ray photoelectron spectroscopy.

In the optical layered body of the present invention, preferably, the hard coat layer before the formation of the dry film layer has, on the surface on which the dry film layer is to be formed, an arithmetic average roughness Ra of the projections and depressions of 0.5 to 7.0 nm as determined in a 1 μm×1 μm measurement field of view, has an average inter-projection distance of the projections and depressions of 10 to 150 nm and a standard deviation of inter-projection distances of the projections and depressions of 40 nm or smaller, and has an arithmetic average roughness Ra of the projections and depressions of 0.5 to 7.0 nm as determined in a 0.12 mm×0.12 mm measurement field of view.

The hard coat layer preferably contains at least one selected from the group consisting of a silicon atom-containing organic compound and an ultraviolet absorber. The silicon atom-containing organic compound is preferably a reactive silicon atom-containing organic compound.

The ultraviolet absorber preferably is a monomer-type ultraviolet absorber having a weight average molecular weight of 220 to 1100.

The dry film layer preferably includes a total of four or more alternately stacked high refractive index layers and low refractive index layers, the high refractive index layers having a refractive index of 2.2 to 2.4 and the low refractive index layers having a refractive index of 1.43 to 1.53.

The present invention will be described in detail below.

The present inventors found out that in an optical layered body in which a hard coat layer containing silica fine particles and a dry film layer are stacked on a substrate film, forming specific projections and depressions on the surface of the hard coat layer on which the dry film layer is to be formed enables the optical layered body to have excellent adhesiveness between the hard coat layer and the dry film layer even in outdoor use. The inventors thus completed the present invention.

The optical layered body of the present invention includes a substrate film and a hard coat layer containing silica fine particles on at least one surface of the substrate film.

The substrate film may contain any material. Examples thereof include polyester resins, acetate resins, polyethersulfone resins, polycarbonate resins, polyamide resins, polyimide resins, polyolefin resins, (meth)acrylic resins, polyvinyl chloride resins, polyvinylidene chloride resins, polystyrene resins, polyvinyl alcohol resins, polyarylate resins, and polyphenylenesulfide resin. In particular, polyester resins, acetate resins, polycarbonate resins, and polyolefin resins are suitable. Specifically, a triacetylcellulose (TAC) substrate is suitable.

When the substrate film is a TAC substrate, some of the components constituting the hard coat layer formed on the substrate can permeate the substrate to form a permeation layer. This permeation layer can prevent the occurrence of interference fringes due to the adhesiveness between the substrate film and the hard coat layer and a difference in refractive index between these layers.

When the substrate film contains a polyester resin (e.g., PET or PEN), the substrate film preferably has in-plane birefringence and a retardation of 3000 nm or higher. Such a substrate film can effectively reduce the occurrence of interference fringes in the optical layered body of the present invention. When the substrate film contains a polyester resin, the substrate may have a retardation of lower than 3000 nm.

The substrate film preferably has a thickness of 15 to 200 µm. A substrate film having a thickness of less than 15 µm easily wrinkles, making it difficult to continuously form the hard coat layer on the substrate film in production of the optical layered body of the present invention. Such a film also greatly curls and tends to have poor pencil hardness. In addition, such a film easily wrinkles under heat during formation of the dry film layer. A substrate film having a thickness of more than 200 µm may not be properly wound into a roll in production the optical layered body of the present invention, or may be disadvantageous for providing a thinner, lighter, and less expensive optical layered body. Such a substrate film is also likely to generate gas (e.g., moisture or organic material) during formation of the dry film layer and thus may inhibit the formation of the dry film layer. The lower limit of the thickness of the substrate film is more preferably 40 µm and the upper limit thereof is more preferably 125 µm.

The substrate film may be subjected to etching treatment such as sputtering, corona discharge, ultraviolet irradiation, electron beam irradiation, chemical conversion, or oxidation or primer coating treatment in advance. Performing these treatments in advance can improve the adhesiveness of the substrate film to the hard coat layer formed thereon. The substrate film surface before the formation of the hard coat layer may optionally be subjected to dust removal or cleaning by, for example, solvent cleaning or ultrasonic cleaning.

In the optical layered body of the present invention, a hard coat layer is formed on the substrate film.

The hard coat layer in the present invention is a cured layer of an organic material or a cured layer of an organic material containing an inorganic material formed between the substrate film and the dry film layer described later. The organic material and inorganic material may be conventionally known materials appropriately selected according to the function imparted to the hard coat layer described later.

The hard coat layer may include a single layer or multiple layers.

The hard coat layer may be imparted a known function such as antistatic function, refractive index adjusting function, or hardness adjusting function.

The function of the hard coat layer may be imparted to a single layer or to multiple layers.

In the optical layered body of the present invention, the hard coat layer before the formation of the dry film layer described later has projections and depressions on the surface on which the dry film layer to be formed. The presence of such projections and depressions allows the optical layered body of the present invention to have excellent adhesiveness between the hard coat layer and the dry film layer described later.

FIG. 1(A) shows an exemplary cross-sectional TEM photograph of the optical layered body of the present invention. FIG. 1(B) shows an exemplary cross-sectional TEM photograph of a conventional optical layered body. In each cross-sectional TEM photograph, the portion including two black layers is a dry film layer, and the layer below the lower black layer is a hard coat layer. Comparison of the figures shows that the interface between the hard coat layer and the dry film layer according to the present invention has an arc shape due to exposed silica fine particles, while the interface between the hard coat layer and the dry film layer in the conventional optical layered body is linear. This indicates that the exposed silica fine particles contribute to an improvement in the adhesiveness.

The cross-sectional TEM photographs can be obtained with EM-002B (Topcon Technohouse Corporation) at an accelerating voltage of 200 kV and a magnification of 29000 times.

The optical layered body of the present invention has such an excellent interlayer adhesiveness that separation does not occur in a cross-hatch test.

The cross-hatch test is performed as follows, for example. A cross-hatch pattern of 100 squares (1 mm×1 mm) is formed on a surface of the dry film layer and the initial state of the cross-hatched surface is observed. Wipe soaked with ethyl alcohol is pressed against the cross-hatched surface at a load of 250 g/cm$^2$ and reciprocated 500 times for a distance of 10 cm (alcohol wipe rubbing test). After the alcohol wipe rubbing test, the state of the cross-hatched surface is observed, and the cross-hatched surface is irradiated with a xenon lamp (xenon arc lamp, 7.5 kW) for 60 hours. The alcohol wipe rubbing test is then performed, and the cross-hatched surface is observed.

The evaluation in the cross-hatch test is determined based on the state of the cross-hatched surface. In the optical layered body of the present invention with excellent inter-layer adhesiveness between the hard coat layer and the dry film layer, separation does not occur in the squares of the cross-hatch pattern, as shown in FIG. 2(A). If the interlayer adhesiveness between the hard coat layer and the dry film layer is poor as in an optical layered body having a conventional hard coat layer, separation may occur in some of the squares of the cross-hatched pattern as shown in FIG. 2(B) or in all of the squares of the cross-hatched pattern as shown in FIG. 2(C).

FIGS. 2(A) to 2(C) are micrographs showing the state of cross-hatched surfaces after the cross-hatch test.

In the present invention, the arithmetic average roughness Ra of the projections and depressions is preferably 0.5 to 7.0 nm, more preferably 5.0 nm or lower, still more preferably 4.0 nm or lower as determined in a 1 µm×1 µm measurement field of view. When the arithmetic average roughness Ra is lower than 0.5 nm or higher than 7.0 nm as determined in a 1 µm×1 µm measurement field of view (hereinafter also referred to as a micro field of view), the adhesiveness between the hard coat layer and the dry film layer may be poor. The presence of such projections and depressions provides suitable slipperiness to the hard coat layer surface, allowing the optical layered body of the present invention to also have excellent anti-blocking properties, for example.

Preferably, the average inter-projection distance of the projections and depressions is 10 to 150 nm and the standard deviation of the inter-projection distances of the projections and depressions is 40 nm or smaller. With an average inter-projection distance of smaller than 10 nm, it may be difficult to achieve excellent anti-blocking properties. With an average inter-projection distance of greater than 150 nm, it may be difficult to achieve dense projections and depressions with little variation that are essential for improvement of the adhesiveness. The lower limit of the average inter-projection distance is more preferably 30 nm and the upper limit thereof is more preferably 100 nm.

In the present invention, for improvement of the adhesiveness between the hard coat layer and the dry film layer, it is important that the average inter-projection distance of the projections and depressions on the hard coat layer falls within the above range and at the same time the projections and depressions are uniform with little variation. If the standard deviation of the inter-projection distances of the projections and depressions is greater than 40 nm, the adhesiveness between the hard coat layer and the dry film layer may be poor.

Herein, the average inter-projection distance of the projections and depressions and the standard deviation are determined as follows.

(1) An image of the surface of the hard coat layer having the projections and depressions is taken with a scanning probe microscope (SPM), with the Z-axis set to 30 nm to achieve a uniform height. The color processing is set such that the region from 15 to 30 nm in the Z-axis direction is colored white and the region from 0 to 15 nm is automatically colored according to the setting of the device. This color setting makes it easy to see the contours of the projections and depressions on the image of the surface of hard coat layer having the projections and depressions.

(2) A 1-µm square region is randomly selected from the image of the surface having the projections and depressions. A line that at least crosses opposing sides of the square region is drawn, and the distances between intersections of the line and the contours of the projections and depressions are actually measured on the image of the surface of the hard coat layer having the projections and depressions. The obtained distances are taken as the inter-projection distances. For a broken contour, the contour is extended to cross the drawn line to form an intersection. The actual measurement may be conducted manually by magnifying the display image of the projections and depressions as much as possible on A4-size paper, or conducted on a PC.

(3) A total of six lines are drawn in different sites in the above region as in the step (2). The distances between projections are measured as in the step (2), and the average of all the inter-projection distances obtained from the six lines is calculated.

The value of n is great in the case of dense projections and depressions and is small in the case of widely varied projections and depressions. The value of n in measurement with six lines is usually 15 or greater.

(4) The standard deviation σ is calculated from all the inter-projection distance data.

As for determination of whether a projection is in contact with the line, a projection in which the region from the peak to 10 nm from the peak crosses the line is regarded as a "projection in contact with the line".

As described above, the optical layered body of the present invention has very fine projections and depressions with a uniform height on the surface of the hard coat layer. Such specific projections and depressions allow the hard coat layer to be excellent in anti-blocking properties and adhesiveness to the substrate film, as well as in adhesiveness to the dry film layer formed on the side of the projections and depressions. In addition, the projections and depressions allows the optical layered body to have excellent adhesiveness between the hard coat layer and the dry film layer after put in a UV environment.

In the optical layered body of the present invention, the hard coat layer before the formation of the dry film layer preferably has, on the surface on which the dry film layer is to be formed, an arithmetic average roughness Ra of the projections and depressions of 0.5 to 7.0 nm, more preferably 5.0 nm or lower, still more preferably 4.0 nm or lower as determined in a 0.12 mm×0.12 mm measurement field of view (hereinafter also referred to as a macro field of view).

In the optical layered body of the present invention, the hard coat layer has the above-described predetermined projections and depressions in the micro field of view on the surface and has predetermined projections and depressions also in the macro field of view. This allows the hard coat layer to maintain the smoothness while providing excellent anti-blocking properties, and also allows the optical layered body to have excellent inter-layer adhesiveness even in outdoor use. In the present invention, the Ra is preferably at the same level in all of the 1 µm×1 µm, 10 µm×10 µm, and 0.12 mm×0.12 mm measurement field of views. The hard coat layer with such projections and depressions on the surface has excellent smoothness, and at the same time has slight irregularities to provide excellent anti-blocking properties.

If the surface of the hard coat layer is not smooth, the Ra of the projections and depressions may vary from one field of view to another.

Herein, the parameters of the projections and depressions, including the arithmetic average roughness Ra, in the micro field of view and macro field of view are determined with SPM-9600 available from Shimadzu Corp., a scanning probe microscope (SPM), for example.

Specifically, first, the device settings are configured, and a first cycle of observation and measurement is performed so that images can be stably taken. The parameters are actually determined with the results from a second cycle of observation and measurement where observation conditions have been appropriately adjusted.

The lever tuning button is pressed for automatic tuning of the probe voltage.

Upon pressing the measurement button, the probe approaches the sample. Upon pressing the observation start button, the probe starts measurement of the sample.

While continuing the measurement, the Z display range (vertical axis range) is set to 20 nm.

Then, while continuing the measurement, the field of view is set to the target range (1 μm×1 μm or 0.12 mm×0.12 mm).

After the completion of the first cycle, the second cycle image is taken.

The system automatically calculates the physical properties from the image file and stores the obtained results in different folders.

Data in one of the folders named "Height trace" contains the values of the arithmetic average roughness Ra, maximum height Rz, and ten-point average roughness Rzjis as the surface roughness analysis results.

The scanning probe microscope can perform a roughness (2D) parameter measurement similar to that of a stylus type surface roughness measuring device.

The definitions of the parameters comply with scanning probe microscope SPM-9600 upgrade kit instruction manual (SPM-9600, February 2016, pp 194-195). The specific definitions are as follows.

[Arithmetic Average Roughness Ra]

A portion stretching over a reference length in the direction in which the average line extends is cut out from the roughness curve. Ra is the value calculated by the formula below when the roughness curve is expressed by y=f(x) with the X axis extending in the same direction as the average line in the portion and the Y axis in the direction of the vertical magnification in the portion.

$$Ra = \frac{1}{L}\int_0^L |f(x)|dx \quad \text{[Math 1]}$$

L: reference length

[Maximum Height Rz]

A portion stretching over a reference length in the direction in which the average line extends is cut out from the roughness curve. Rz is the gap between the peak line and the trough line measured in the direction of the vertical magnification of the roughness curve in the portion.

[Ten-Point Average Roughness Rzjis]

A portion stretching over a reference length in the direction in which the average line extends is cut out from the roughness curve. The levels (Yp) of the highest to fifth highest peaks and the levels (Yv) of the lowest to fifth lowest troughs in this portion are measured, both from the average line in the direction of the vertical magnification. The Rzjis is the sum of the average of the absolute values of the levels (Yp) and the average of the absolute values of the levels (Yv).

If the roughness curve has less than 10 peaks and troughs in total, the total number of peaks and troughs should be presented in the parentheses following the Rzjis value. The ten-point average roughness in the manual is expressed as "Rz" as in the following formula, but this means "Rzjis".

$$Rz = \frac{|Y_{p1} + Y_{p2} + Y_{p3} + Y_{p4} + Y_{p5}| + |Y_{v1} + Y_{v2} + Y_{v3} + Y_{v4} + Y_{v5}|}{5} \quad \text{[Math 2]}$$

The hard coat layer before the formation of the dry film layer preferably has a Rzjis of 5 to 50 nm and preferably has a Rz of 10 to 30 nm on the surface on which the dry film layer is to be formed. The upper limit of the Rzjis is more preferably 30 nm. The upper limit of the Rz is more preferably 20 nm.

When the parameters Rzjis, Rz and Ra are satisfied, the smoothness can be maintained while anti-blocking properties can be obtained in sputtering during which a vacuum is drawn. In addition, excellent adhesiveness is obtained outdoors.

The control of the Ra allows understanding of the overview of the projections and depressions on the surface of the hard coat layer. The Rz defines the limits in the height and depth directions of the projections and depressions on the surface of the hard coat layer. The Rzjis shows the averages of the limits of the height and depth of the projections and depressions on the surface of the hard coat layer. The control of the Rzjis and Rz within the predetermined ranges in addition to the control of the Ra enables precise control of the projections and depressions on the surface of the hard coat layer that is impossible with the control of the Ra alone.

In the optical layered body of the present invention, a load-indentation curve of the hard coat layer before the formation of the dry film layer preferably shows a continuous change as determined by a nanoindentation method with a nanoindenter on the surface on which the dry film layer is to be formed. That "a load-indentation curve shows a continuous change" means that the load-indentation curve has no inflection point or singular point. When the load-indentation curve shows a continuous change, the optical layered body of the present invention can have excellent adhesiveness between the hard coat layer and the dry film layer.

The nanoindenter may be PICODENTOR HM-500 available from Fischer Instruments K.K., for example.

The load-indentation curve can be determined by a nanoindentation method using a nanoindenter as follows. Specifically, for example, a graph with the horizontal axis indicating the indentation depth (nm) and the vertical axis indicating the load (mN) is made under the conditions of an indentation of 300 nm and a loading rate of 10 nm/s using a Berkovich three-sided pyramidal indenter (angle between ridges: 115°).

If no silica fine particles are present in the hard coat layer, the load-indentation curve determined by the nanoindentation method using a nanoindenter may have a singular point.

The hard coat layer has an average silica fine particle abundance in ten 0.2 μm×0.2 μm regions of 30 to 80%, preferably 40 to 70% and a standard deviation of silica fine particle abundances in the 10 regions of 1 to 7, where the 10 regions are randomly selected from a cross section of the hard coat layer in the thickness direction within the range from the dry film layer side interface to 10% of the thickness in the thickness direction. If the average silica fine particle abundance is less than 30%, the hard coat layer can have a smooth surface but fails to have projections and depressions needed for preventing blocking, and also is less likely to achieve adhesiveness outdoors. If the average silica fine particle abundance is more than 80%, the hard coat layer can exhibit highly excellent anti-blocking properties, but lose the surface smoothness. In addition, such an average silica fine particle abundance makes it difficult to adjust the standard deviation of the silica fine particle abundances within the suitable range, and also adversely affects the adhesiveness outdoors.

Unlike on the dry film layer side surface, the silica fine particle abundance on the substrate film side surface may be less than 30%. A silica fine particle abundance of more than 90% on the substrate film side adversely affects the adhesiveness of the hard coat layer to the substrate film. Such an abundance also affects the refractive index and thus tends to cause interference fringes.

The silica fine particle abundance is determined by analyzing a STEM image of a cross section of the hard coat layer in the thickness direction with image processing software Image-Pro Plus, and calculating the ratio of the silica area in a 0.2 μm×0.2 μm region. The silica area is determined as follows: The image is opened on the image processing software, with the silica fine particles in the 0.2 μm×0.2 μm region displayed as objects in a color (dark color) that provides color contrast. "Calculate" is selected from the menu of the software, whereby the image is thresholded and the sum of the areas is determined. The ratio of the silica area is determined in a total of 10 regions in the same manner, and the average of the 10 regions is taken as the silica fine particle abundance.

The hard coat layer contains silica fine particles. The silica fine particles are exposed on the dry film layer side surface of the hard coat layer. With such a structure, the dry film layer described later strongly attaches to the binder resin of the hard coat layer and at the same time more strongly attaches to the exposed silica fine particles. This improves the adhesiveness between the hard coat layer and the dry film layer, thereby improving the scratch resistance of the optical layered body of the present invention.

That "the silica fine particles are exposed on the dry film layer side surface (hereinafter also simply referred to as a surface) of the hard coat layer" means that part of the silica fine particles protrudes from the surface of the hard coat layer and the protruding part of the silica fine particles does not contain the binder resin constituting the hard coat layer.

The silica fine particles may be exposed by any method that allows selective etching of the binder resin of the hard coat layer as described below. For example, glow discharge treatment, plasma treatment, ion etching, or alkali treatment may be used.

The average protrusion proportion of the silica fine particles exposed on the surface of the hard coat layer is preferably 60% or lower, more preferably 10% or higher and 30% or lower relative to the average particle size. With too high a protrusion proportion, the silica fine particles easily separate from the binder resin, leading to a low adhesiveness between the hard coat layer and the dry film layer. With too low a protrusion proportion, the silica fine particles have an insufficient improving effect on the adhesiveness.

Preferably, the silica fine particles have an average particle size of 7 to 80 nm and are dispersed in the hard coat layer in the form of single particles. The silica fine particles dispersed in this manner form the fine projections and depressions in the micro field of view on the surface of the hard coat layer. In addition, such silica fine particles increase the hardness of the hard coat layer and also improve the adhesiveness between the hard coat layer and the dry film layer described later. Silica fine particles with an average particle size of smaller than 7 nm are difficult to disperse in the form of single particles. Silica fine particles with an average particle size of greater than 80 nm may form large projections and depressions that have a Ra greater than the above-described value in the micro field of view, and thus may lead to poor adhesiveness between the hard coat layer and the dry film layer. It is important that such dispersibility is provided in the hard coat layer, particularly on the side on which the dry film layer is to be formed. An average particle size of greater than 80 nm may also deteriorate the haze of the optical layered body of the present invention. The lower limit of the average particle size of the silica fine particles is more preferably 10 nm, and the upper limit thereof is more preferably 60 nm.

The silica fine particles may be untreated or surface-treated.

The hard coat layer preferably contains a silicon atom-containing organic compound and/or an ultraviolet absorber.

With the silicon atom-containing organic compound and/or ultraviolet absorber, the optical layered body of the present invention has excellent adhesiveness between the hard coat layer and the dry film layer after the weathering test using a xenon light. The hard coat layer contains residual unreacted UV curable monomer/oligomer/polymer components (functional groups such as a methacrylate group, acrylate group, vinyl group, epoxy group, or thiol group). The monomer components react when put under a UV environment and causes curing shrinkage of the hard coat layer. This is one of the causes of the reduction in the adhesiveness between the hard coat layer and the dry film layer. The silicon atom-containing organic compound and/or ultraviolet absorber are/is considered to prevent the residual monomer components from reacting and thus improve the adhesiveness between the hard coat layer and the dry film layer.

The amount of the ultraviolet absorber in the hard coat layer is preferably within the range of 0.25 to 10 parts by mass relative to 100 parts by mass of a total mass of the binder resin (solids content 100%) and the silica fine particles (solids content 100%). If the amount is less than 0.25 parts by mass, the improvement effect on the adhesiveness between the hard coat layer and the dry film layer is less noticeable. If the amount is more than 10 parts by mass, the optical layered body of the present invention may have poor transparency. In addition, the hard coat layer itself may have a reduced hardness and exhibits a reduced pencil hardness, for example. The lower limit of the amount of the ultraviolet absorber is more preferably 0.5 parts by mass and the upper limit thereof is more preferably 5 parts by mass. When the optical layered body of the present invention is used outdoors for a long period of time, deterioration and curing shrinkage of the hard coat layer may reduce the adhesiveness between the hard coat layer and the dry film layer. The addition of the ultraviolet absorber prevents the reduction, leading to a better optical layered body.

The ultraviolet absorber preferably contains a monomer-type ultraviolet absorber having a weight average molecular weight of 220 to 1100 as a main component. The main component means that, when multiple ultraviolet absorbers are contained, the amount of the monomer-type ultraviolet absorber is more than 50% by mass.

If the hard coat layer contains a polymer-type ultraviolet absorber alone, the hard coat layer itself may have a reduced hardness and thus have a reduced pencil hardness because many polymer-type ultraviolet absorbers themselves have a weak skeleton.

In cases where a monomer-type ultraviolet absorber and a polymer-type ultraviolet absorber are used in combination, increasing the amount of the polymer-type ultraviolet absorber reduces the ratio of a monomer component (multifunctional monomer) in the binder resin in the composition for a hard coat layer used for the formation of the hard coat layer (described later). This not only may reduce the hardness of the hard coat layer but also may reduce the adhesiveness between the hard coat layer and the substrate film. The hard coat layer may contain silica fine particles for purposes such as an increase in hardness, adjustment of the refractive index, or formation of projections and depressions. If the ultraviolet absorber contains, for example, a hydrophobic polymer-type ultraviolet absorber, the polymer-type ultraviolet absorber may affect the dispersibility of the silica fine particle.

Commercially available monomer-type ultraviolet absorbers include: benzotriazole ultraviolet absorbers such as TINUVIN 99-2, TINUVIN 384-2, TINUVIN 900, and TINUVIN 1130 (BASF), ADEKA STAB LA29, ADEKA STAB LA31, ADEKA STAB LA32, and ADEKA STAB LA36 (Adeka Corporation), and KEMISOLB73 (Chemipro Kasei Kaisha, Ltd.); and hydroxyphenyltriazine (HPT) ultraviolet absorbers such as TINUVIN 400, TINUVIN 405, TINUVIN 460, and TINUVIN 477, TINUVIN479 (BASF) and ADEKA STAB LA46 and ADEKA STAB LAF70 (Adeka Corporation).

The monomer-type ultraviolet absorber may bleed out with time, usually because of a change in the storage environment or usage environment of the optical layered body. The optical layered body of the present invention, however, can suitably prevent bleeding out of the monomer-type ultraviolet absorber because a dense dry film layer is formed on the hard coat layer as described later. An ultraviolet absorber having a weight average molecular weight of more than 1100 may reduce the hardness of the hard coat layer itself.

The silicon atom-containing organic compound is preferably a reactive silicon atom-containing organic compound. Such reactive silicon atom-containing organic compounds include silane coupling agents. When the hard coat layer contains a silane coupling agent, projections and depressions having a specific shape, particularly having a uniform height, can be formed on the surface of the hard coat layer. In addition, the silane coupling agent is compatible with the silica fine particles contained in the hard coat layer. The silane coupling agent is also highly reactive with the exposed silica fine particles in the hard coat layer. The silane coupling agent is thus considered to enhance the adhesiveness between the hard coat layer and the dry film layer.

The silane coupling agent is more preferably a reactive silane coupling agent containing, in the molecule, a (meth) acrylate group, an epoxy group, or a thiol group. Such a reactive silane coupling agent can react with resin components in the hard coat layer to form a crosslinked structure, thus preventing bleeding out.

In the optical layered body of the present invention, the hard coat layer has a silicon atom abundance A of 3 to 10%, preferably 3 to 7% on the surface opposite to the substrate film side surface as determined by X-ray photoelectron spectroscopy. The hard coat layer also preferably has a silicon atom abundance B on the substrate film side surface that is smaller than the silicon atom abundance A as determined by X-ray photoelectron spectroscopy. In other words, the silicon atoms are preferably unevenly distributed in the hard coat layer.

Such uneven distribution of silicon atoms is considered to allow suitable formation of the projections and depressions on the surface of the hard coat layer. The silicon atom abundance B may be almost 0 or may be 0 (no silicon atom is present on the substrate film side surface of the hard coat layer). Preferably, the silicon atom abundance B is ⅓ to ¹/₁₀ of the silicon atom abundance A.

The silicon atom abundances can be determined by X-ray photoelectron spectroscopy as follows.

Abundance A: An intermediate layered body including a substrate film and a hard coat layer is produced (by drying at 70° C.×1 min followed by curing at a cumulative UV dose of 200 mJ/cm$^2$). The outermost surface of the hard coat layer is analyzed to determine the amounts of C, O, and Si. The Si proportion (%) in the total amount of C, O, and Si taken as 100 is determined as the silicon atom abundance A.

Abundance B: The hard coat layer in the above intermediate layered body cannot be separated from the substrate film because of the excellent adhesiveness. For determination of the abundance B, thus, a layered body including a substrate and a hard coat layer is produced under the same conditions as those for the abundance A with a substrate that allows separation of the hard coat layer therefrom, such as untreated PET or untreated COP. Thereafter, a plastic tape is applied to the hard coat layer side, and the hard coat layer and the substrate film are separated from each other to expose the substrate film side surface of the hard coat layer. The abundance B is determined with this sample in the same manner as the abundance A.

The X-ray photoelectron spectroscopy, or electron spectroscopy for chemical analysis (ESCA), may be performed under the following conditions using AXIS-NOVA, available from Kratos Analytical Ltd. The analysis was performed at a normal angle (90° C.) without changing the angle.

X-ray source: monochromated Al
Accelerating voltage: 15 kV
Emission current: 10 mA
Measured area: 300×700 μmφ

As described above, the silicon atoms in the hard coat layer in the optical layered body of the present invention are preferably concentrated around the dry film layer side interface. Such concentration of the silicon atoms is possible when the hard coat layer contains the silane coupling agent. This is presumably because the silane coupling agent serves a role similar to that of what is called a leveling agent.

Here, a silane coupling agent having a low molecular weight may permeate a TAC substrate along with a permeating solvent when the composition for a hard coat layer described later is applied to the TAC substrate. In such a case, the effects described above may not be obtained. In the present invention, thus, the hard coat layer preferably contains a silane coupling agent having a weight average molecular weight of at least 1000. The amount of the silane coupling agent to be added is preferably 2 to 15 parts by mass relative to 100 parts by mass of a total amount of the binder resin (solids content 100%) and the silica fine particles (solids content 100%). Addition of too large an amount of a silane coupling agent may cause whitening of the appearance, and also may reduce the hardness and increase the Ra. In addition, it may reduce the adhesiveness at the interface between the substrate and the hard coat layer. Addition of less than 2 parts by mass of silane coupling agent does not provide a silicon atom abundance needed for the dry film layer to have excellent adhesiveness.

Commercially available low-molecular-weight silane coupling agents include KBM503, KBM5803, KBM4803, KBM403, KBE503, KBM502, and KBM1083 available from Shin-Etsu Chemical Co., Ltd.

Commercially available silane coupling agents that are oligomers (having a molecular weight of at least 1000) include X411805, X411810, KR513, KR516, and KR5167 (main chain: SiOSi, side chain: side chain containing a UV reactive group and an alkoxide) and X121048, X121050, X121154, X129815, and X12984S (main chain: MMA, side chain: side chain containing a UV reactive group and an alkoxide), all available from Shin-Etsu Chemical Co., Ltd.

In particular, the oligomer-type silane coupling agents are preferred for triacetylcellulose (TAC) substrates. This is because low-molecular-weight silane coupling agents permeate TAC substrates and thus less likely to remain on the surface of the hard coat layer while they are less likely to permeate other substrates such as PET substrate.

In particular, oligomer-type silane coupling agents whose main chain has a siloxane structure —Si—O—Si— are preferred because such silane coupling agents tend to concentrate near the dry film layer side interface.

The silicon atom abundance A includes silicon atoms derived from the silica particles, the silane coupling agent, and the like. The total amount of these silicon atoms has effect on the adhesiveness.

The binder resin contained in the hard coat layer is preferably transparent. For example, the binder resin is preferably one obtained by curing an ionizing radiation-curable resin (i.e., a resin curable by ultraviolet irradiation or electron beam irradiation) by ultraviolet irradiation or electron beam irradiation.

The "resin" herein includes monomers, oligomers, and polymers unless otherwise specified.

Examples of the ionizing radiation-curable resin include compounds having one or two or more unsaturated bonds, such as compounds having an acrylate functional group. Examples of the compound having one unsaturated bond include ethyl (meth)acrylate, ethylhexyl (meth)acrylate, styrene, methylstyrene, and N-vinylpyrrolidone. Examples of the compound having two or more unsaturated bonds include polyfunctional compounds such as trimethylolpropane tri(meth)acrylate, tripropylene glycol di(meth)acrylate, diethylene glycol di(meth)acrylate, dipropylene glycol di(meth)acrylate, pentaerythritol tri(meth)acrylate, pentaerythritol tetra(meth)acrylate, dipentaerythritol hexa(meth)acrylate, 1,6-hexanediol di(meth)acrylate, neopentyl glycol di(meth)acrylate, trimethylolpropane tri(meth)acrylate, ditrimethylolpropane tetra(meth)acrylate, dipentaerythritol penta(meth)acrylate, tripentaerythritol octa(meth)acrylate, tetrapentaerythritol deca(meth)acrylate, isocyanuric acid tri(meth)acrylate, isocyanuric acid di(meth)acrylate, polyester tri(meth)acrylate, polyester di(meth)acrylate, bisphenol di(meth)acrylate, diglycerin tetra(meth)acrylate, adamantyl di(meth)acrylate, isobornyl di(meth)acrylate, dicyclopentane di(meth)acrylate, tricyclodecane di(meth) acrylate, and ditrimethylolpropane tetra(meth)acrylate. Preferred are pentaerythritol triacrylate (PETA), dipentaerythritol hexaacrylate (DPHA), and pentaerythritol tetraacrylate (PETTA). The "(meth)acrylate" herein refers to methacrylate and acrylate. In the present invention, the ionizing radiation-curable resin may also be any of the above compounds modified with propylene oxide (PO), ethylene oxide (EO), caprolactone (CL), and the like.

In addition to the above compounds, also usable as the ionizing radiation-curable resin are polyester resin, polyether resin, acrylic resin, epoxy resin, urethane resin, alkyd resin, spiroacetal resin, polybutadiene resin, and polythiol polyene resin that include an unsaturated double bond.

The ionizing radiation-curable resin may be used in combination with a solvent-drying resin (resin formed into a coating film only by drying the solvent added for adjusting the solids content in application, e.g. thermoplastic resins). Any solvent-drying resin may be used in combination with the ionizing radiation-curable resin. The solvent-drying resin may usually be a thermoplastic resin.

The thermoplastic resin is not particularly limited, and examples thereof include styrene resins, (meth)acrylic resins, vinyl acetate resins, vinyl ether resins, halogen-containing resins, alicyclic olefin resins, polycarbonate resins, polyester resins, polyamide resins, cellulose derivatives, silicone resins, and rubber/elastomers. The thermoplastic resin is preferably amorphous and soluble in an organic solvent (especially a common solvent dissolving a plurality of polymers and curable compounds). From the standpoint of transparency and weather resistance, preferable resins are styrene resins, (meth)acrylic resins, alicyclic olefin resins, polyester resins, and cellulose derivatives (cellulose esters).

The hard coat layer may contain a thermosetting resin.

The thermosetting resin is not particularly limited, and examples thereof include phenol resin, urea resin, diallyl phthalate resin, melamine resin, guanamine resin, unsaturated polyester resin, polyurethane resin, epoxy resin, aminoalkyd resin, melamine-urea cocondensated resin, silicone resin, and polysiloxane resin.

The hard coat layer can be produced by applying, onto the substrate film, a composition for a hard coat layer containing the silica fine particles, the silicon atom-containing compound and/or ultraviolet absorber, the monomer component of the binder resin, the solvent, and the like, drying the composition, and curing the obtained coating film with ionizing radiation irradiation or the like, for example.

Examples of the solvent contained in the composition for a hard coat layer include alcohols (e.g., methanol, ethanol, propanol, isopropanol, n-butanol, s-butanol, t-butanol, benzyl alcohol, PGME, ethylene glycol), ketones (e.g., acetone, methyl ethyl ketone, methyl isobutyl ketone, cyclohexanone), ethers (e.g., dioxane, tetrahydrofuran), aliphatic hydrocarbons (e.g., hexane), alicyclic hydrocarbons (e.g., cyclohexane), aromatic hydrocarbons (e.g., toluene, xylene), halocarbons (e.g., dichloromethane, dichloroethane), esters (e.g., methyl acetate, ethyl acetate, butyl acetate), cellosolves (e.g., methyl cellosolve, ethyl cellosolve), cellosolve acetates, sulfoxides (e.g., dimethylsulfoxide), and amides (e.g., dimethylformamide, dimethylacetamide), and mixtures thereof.

The composition for a hard coat layer preferably further contains a photopolymerization initiator.

The photopolymerization initiator is not particularly limited, and a known photopolymerization initiator may be used. Specific examples thereof include acetophonones, benzophenones, Michler's benzoylbenzoates, α-amyloxime esters, thioxanthones, propiophenones, benzyls, benzoins, and acylphosphine oxides. Combination use with a photosensitizer is preferable. Specific examples of the photosensitizer include n-butylamine, triethylamine, and poly-n-butylphosphine. Preferred among the photopolymerization initiators are those that are less likely to volatilize or sublime under heat when the dry film layer is formed.

Preferred photopolymerization initiators also include compounds having two or more cleavage sites in the molecule. Examples thereof include 2-hydroxy-1-{4-[4-(2hydroxy-2-methyl-propionyl)-benzyl]phenyl}-2-methyl-propan-1-one (IRGACURE 127) and oligo{2-hydroxy-2-methyl-1-[4-(1-methylvinyl)phenyl]propanone} (ESACURE ONE).

In cases where the binder resin is a resin having a radical polymerizable unsaturated group, the photopolymerization initiator is preferably one or a mixture of two or more of acetophenones, benzophenones, thioxanthones, benzoin, and benzoin methyl ether. In cases where the binder resin is a resin having a cationic polymerizable functional group, the photopolymerization initiator is preferably one or a mixture of two or more of aromatic diazonium salt, aromatic sulfonium salt, aromatic iodonium salt, a metallocene compound, and benzoin sulfonate ester.

The amount of the photopolymerization initiator in the composition for a hard coat layer is preferably 0.5 to 10.0 parts by mass relative to 100 parts by mass of the binder resin. If the amount is less than 0.5 parts by mass, the formed hard coat layer may have insufficient hard coat properties. If the amount is more than 10.0 parts by mass, curing is undesirably inhibited, which may reduce the pencil hardness. In addition, in forming the dry layer film, components derived from an unreacted portion or reaction residue of the photopolymerization initiator may volatilize or sublime to inhibit the formation of the dry film layer, preventing the desired mechanical and optical characteristics from being exhibited. Moreover, the volatilized or sublimed components derived from the photopolymerization initiator may attach to the optical layered body to cause defects, resulting in lower quality.

The raw material proportion (solids content) in the composition for a hard coat layer is not limited. It is typically 5 to 70% by mass and is particularly preferably 20 to 60% by mass from the viewpoint of coating properties of the composition for a hard coat layer. Since the composition for a hard coat layer is applied to a thickness of several micrometers, too low a solids content (i.e., too high a solvent content) makes it difficult to dry the coating film and tends to result in an uneven thickness of the formed hard coat layer. The composition for a hard coat layer with too high a solids content has poor leveling properties, which tends to result in an uneven thickness and poor appearance of the formed hard coat layer.

The composition for a hard coat layer may contain a known additive such as a dispersant, surfactant, antistatic agent, thickener, discoloration inhibitor, colorant (pigment, dye), defoamer, leveling agent, flame retardant, adhesion imparting agent, polymerization inhibitor, antioxidant, or surface modifier, according to the purpose such as an increase in the hardness of the hard coat layer, a reduction in curing shrinkage, or control of the refractive index.

Preferred leveling agents include silicone oil and fluorine-based surfactants because they prevent the hard coat layer from having the Bénard cell structure. When a resin composition containing a solvent is applied and dried, a surface tension difference occurs between the surface and the inside of the coating film, and this causes many convection currents in the coating film. The structure formed by this convection is called a Bénard cell structure. The Bénard cell structure causes problems on the resulting hard coat layer such as orange peel or defective coating.

The Bénard cell structure also may result in excessively large projections and depressions on the hard coat layer, possibly impairing the appearance of the optical layered body of the present invention. The use of the above leveling agent can prevent the convection, which not only makes it possible to form a hard coat layer without defects or unevenness, but also makes it easy to adjust the projections and depressions on the hard coat layer.

The composition for a hard coat layer may be prepared by any method that allows uniform mixing of the components. For example, the composition may be prepared with a known device such as a paint shaker, a bead mill, a kneader, or a mixer.

The composition for a hard coat layer may be applied to the light-transmitting substrate by any method. For example, a known method may be used such as spin coating, dipping, spraying, die coating, bar coating, roll coating, meniscus coating, flexo printing, screen printing, and bead coating.

After the composition for a hard coat layer is applied by any of the above methods, the workpiece is transported to a heated zone for drying and the coating film is dried by a known method to evaporate the solvent. At this time, the dispersion state of the silica fine particles can be adjusted by selecting the relative solvent evaporation speed, the solids concentration, the coating solution temperature, the drying temperature, the velocity of drying air blow, the drying time, the ambient solvent concentration in the drying zone, and the like.

In particular, a method of adjusting the dispersion state of the silica fine particles by selecting the drying conditions is simple and thus preferable. Specifically, the dispersion state of the silica fine particles may be adjusted to the desired state by performing, once or multiple times, a drying treatment in which the a drying temperature and the drying time are appropriately selected within the range of 50° C. to 100° C. and the range of 30 seconds to 2 minutes, respectively.

Examples of the ionizing radiation method for curing the coating film after the drying include methods using light sources such as a ultrahigh pressure mercury lamp, a high pressure mercury lamp, a low pressure mercury lamp, a carbon arc lamp, a black-light fluorescent lamp, or a metal halide lamp.

The wavelength of ultraviolet light to be used may be within the range of 190 to 380 nm. Specific examples of the electron beam source include electron accelerators such as a Cockcroft-Walton type accelerator, a Van de Graaff type accelerator, a resonance transformer type accelerator, an insulation core transformer type accelerator, a linear type accelerator, a dynamitron type accelerator, and a high frequency type accelerator.

In the optical layered body of the present invention, the hard coat layer preferably has a hardness of, for example, H or higher, more preferably 2H or higher as determined in a pencil hardness test (load: 500 g, speed: 1 mm/sec) in conformity with JIS K5600-5-4(1999).

The hard coat layer preferably has a thickness of 1 to 20 µm. If the thickness of the hard coat layer is smaller than 1 µm, the hard coat layer may not sufficiently prevent low-molecular-weight components (e.g., oligomers) from separating out of the light-transmitting substrate and also may be susceptible to damage. In addition, less UV curable binder resin (e.g., monomers) permeates the substrate film such as a TAC substrate, which may result in a reduction in the adhesiveness between the substrate film and the hard coat layer and a reduction in the visibility due to an increase in interference fringes. If the thickness of the hard coat layer is greater than 20 µm, the hard coat layer not only fails to have a thin thickness but also may easily break, curl, or wrinkle. The hard coat layer may also release low-molecular-weight organic components or water during the formation of the dry film layer and thereby inhibit the formation of the dry film layer, leading to insufficient adhesiveness between the hard coat layer and the dry film layer. The curling of the hard coat layer may cause cracks of the dry film layer after the formation thereof.

The thickness of the hard coat layer is more preferably within the range of 2 to 15 µm, still more preferably 4 to 10

μm. The thickness of the hard coat layer can be measured by cross-sectional observation with a microscope.

The hard coat layer preferably has a refractive index of 1.45 to 1.60. If the refractive index of the hard coat layer is out of the range, a great difference in refractive index exists between the hard coat layer and the substrate film, which may cause interference fringes.

The optical layered body of the present invention may have a different hard coat layer on the surface of the substrate film opposite to the surface on which the hard coat layer described above is formed. In this case, curling of the optical layered body of the present invention can be prevented. In addition, scratches are less likely to be formed in the production process, and generation of gas from the substrate film can be reduced.

The different hard coat layer can be formed using the same materials as those for the hard coat layer described above. Formation of the different hard coat layer can increase the anti-blocking properties and slipperiness of the optical layered body of the present invention.

The optical layered body of the present invention includes a dry film layer on the surface of the hard coat layer opposite to the substrate film side surface of the hard coat layer.

In the present invention, the dry film layer serves as an anti-reflection layer (AR layer). The dry film layer may include two or more stacked layers having different refractive indexes.

In the optical layered body of the present invention, the dry film layer is directly formed on the surface of the hard coat layer on which the silica fine particles are exposed. Such a structure provides highly excellent adhesiveness between the hard coat layer and the dry film layer.

The dry film layer may be composed of an adhesive layer and an anti-reflection layer (AR layer).

The adhesive layer is formed on the surface of the hard coat layer on which the silica fine particles are exposed. The adhesive layer contains an oxygen-deficient metal oxide of the same kind as the silica fine particles or a metal.

The degree of oxidation of the adhesive layer may be appropriately designed according to the functional layer formed on the adhesive layer. The adhesive layer preferably has a thickness of 10 nm or less.

Various methods for forming the refractive index layers have been devised. Examples thereof include dry treatments such as a sputtering method, an evaporation method, and an ion plating method. Although any of such methods provide sufficient anti-reflection properties, a sputtering method is preferred because the optical layered body of the present invention needs to have sufficient mechanical properties, durability, and environment resistance to serve as an outermost surface, in particular an outermost surface of a touch panel, when used in an image display device. Most preferred is a roll coating method in which film formation is performed while winding the hard coat layer into a roll in a vacuum chamber so as to increase the production efficiency.

Of the refractive index layers constituting the dry film layer, the refractive index layer having a relatively high refractive index (hereinafter also referred to as a high refractive index layer) preferably has a refractive index of 2.2 to 2.4. Preferred materials for the layer are light-transmitting materials having a relatively high refractive index. For example, SiN, $TiO_2$, $Nb_2O_5$, $Ta_2O_5$, ITO, and alloy oxides containing any of them as a main component are usually used. Specific examples of the alloy oxide include alloy oxides in which a metal such as Si, Sn, Zr, or Al has been added to SiN, $TiO_2$, $Nb_2O_5$, $Ta_2O_5$, or ITO as a main component without affecting the characteristics thereof.

Preferred among them are $Nb_2O_5$ and SiN because materials for $Ta_2O_5$ are expensive, and also because $TiO_2$ tends to exhibit absorption in the short wavelength region, thus reducing the production efficiency and easily causing variation especially when the dry film layer is formed by a sputtering method.

The refractive index layer having a relatively low refractive index (hereinafter also referred to as a low refractive index layer) preferably has a refractive index of 1.43 to 1.53. For example, $MgF_2$, $SiO_2$, or a material obtained by adding a trace amount of additive thereto may be used. For formation of the low refractive index layer by a sputtering method, $SiO_2$ is most preferred.

The hard coat layer or the adhesive layer is preferably surface-modified by plasma treatment in a vacuum chamber before the anti-reflection film is formed thereon, so as to improve the adhesiveness between the layers. The adhesive layer is preferably formed after the surface modification.

The adhesive layer may contain a metal oxide or metal nitride such as $CrO_x$ (x=1 to 2) or $SiN_x$. In particular, the adhesive layer preferably includes a film of partially reduced Si oxide $SiO_x$ (x=1 to 2) having a thickness of around 3 nm or greater and 10 nm or smaller formed by a sputtering method. A SiOx film having a thickness of smaller than 3 nm may have insufficient adhesiveness. A SiOx film having a thickness of 10 nm or greater may lead to insufficient transmittance due to light absorption by the SiOx film.

An antifouling layer may be formed on the surface of the dry film layer opposite to the hard coat layer side surface of the dry film layer.

For example, a known antifouling layer having a thickness of around 3 to 5 nm is preferably formed by a wet method. An antifouling layer having a thickness of smaller than 3 nm does not have sufficient soil resistance. An antifouling layer having a thickness of greater than 5 nm may affect the optical characteristics.

The dry film layer preferably includes a total of four or more alternately stacked high refractive index layers and low refractive index layers.

The dry film layer with such a structure has particularly excellent anti-reflection properties as well as excellent adhesiveness to the hard coat layer.

The high refractive index layers specifically preferably each have a thickness of 10 to 200 nm and a refractive index of 2.2 to 2.4. The low refractive index layers each preferably have a thickness of 10 to 200 nm and a refractive index of 1.43 to 1.53.

When a total of four or more such high refractive index layers and low refractive index layers are alternatively stacked, the thickness of each high refractive index layers is more preferably 20 to 70 nm and the thickness of each low refractive index layers is more preferably 20 to 120 nm.

In the optical layered body of the present invention, the high refractive index layers, the hard coat layer, and the low refractive index layers preferably satisfy the refractive index relation represented by Formula (1) below.

Refractive index of high refractive index layer >refractive index of hard coat layer >refractive index of low refractive index layer (1)

In the optical layered body of the present invention, the thicknesses of the low refractive index layers, high refractive index layers, and conductive layer are determined as follows. Any two points are selected on a TEM or STEM cross-sectional observation photograph, and the thickness is measured at the two points. The same operation is performed five times in different areas of the same sample. The average of the thicknesses at the 10 points is calculated as the thickness (nm).

The above measurement method is also used for calculating the thickness of other films than the low refractive index layers, high refractive index layers, and conductive layer when the films are thin films having a thickness on the order of nanometers.

In the optical layered body of the present invention, the refractive indexes of the low refractive index layers and high refractive index layers are calculated by, assuming that the refractive index at the wavelength range from 380 nm to 780 nm is constant, fitting a reflection spectrum obtained with a spectrophotometer to a spectrum calculated from an optical model of the thin film obtained using Fresnel formula.

The optical layered body of the present invention may be in the form of a long sheet wound into a roll. The roll of a long sheet of the optical layered body of the present invention may be produced by forming the hard coat layer, the high refractive index layers, low refractive index layers, and conductive layer each by a roll-to-roll method using a roll of a long sheet of a light-transmitting substrate. In the formation of such a roll, a protection film including a low adhesion layer may be bonded as a separator to the surface of the hard coat film for a touch panel before winding into a roll. In the optical layered body of the present invention, however, anti-blocking properties and slipperiness can be improved, so that it is possible to form a roll of a long sheet of the optical layered body of the present invention without the protection film.

Advantageous Effects of Invention

The optical layered body of the present invention has the above structure. The optical layered body of the present invention thus has excellent interlayer adhesiveness, particularly even in outdoor use, and can improve anti-blocking properties.

The optical layered body of the present invention is thus suitable for use in image display devices.

DESCRIPTION OF EMBODIMENTS

Figure 1:
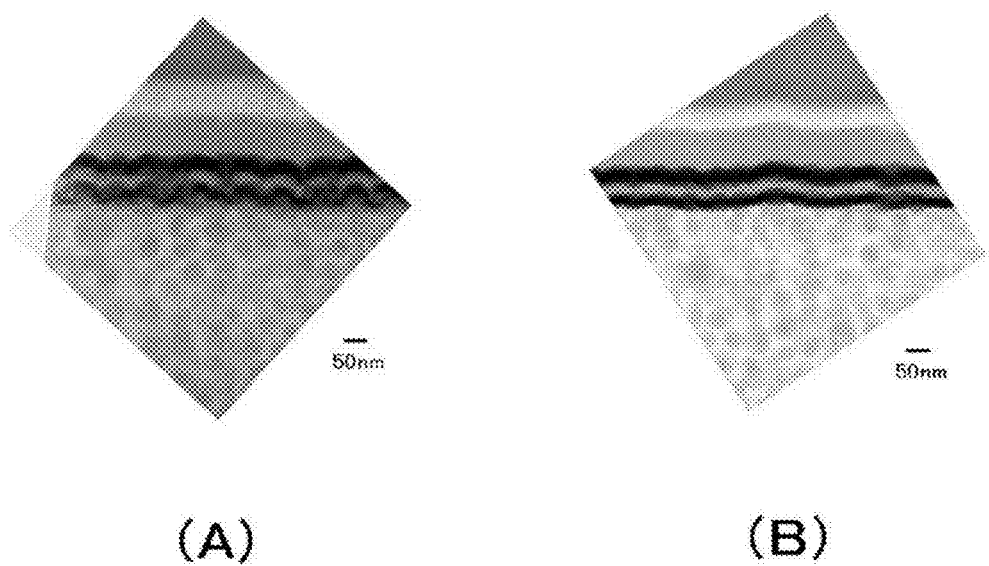
FIG. 1(A) is an exemplary cross-sectional TEM photograph of the optical layered body of the present invention.
FIG. 1(B) is an exemplary cross-sectional TEM photograph of a conventional optical layered body.
Figure 2:
FIGS. 2(A) to (C) are micrographs showing the state of cross-hatched surfaces after a cross-hatch test.
Figure 2:
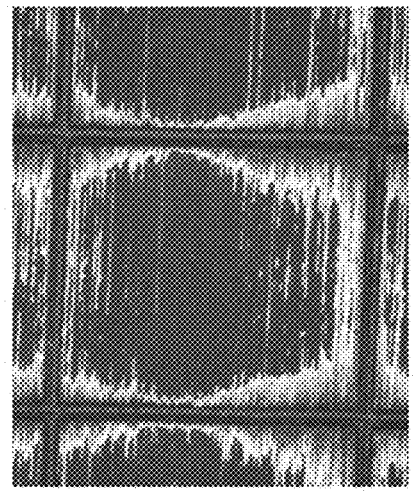
Figure 2:
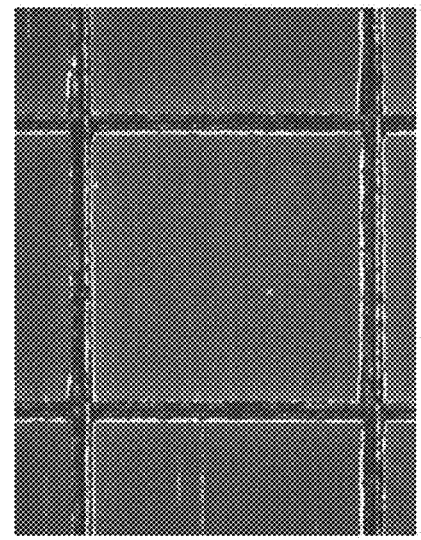

The present invention will be described by means of the following examples which are not intended to limit the scope of the present invention.
(Preparation of a Composition for Hard Coat Layer Formation)

The materials shown in Table 1 below were uniformly mixed with a paint shaker to prepare compositions for hard coat layer formation HC1 to HC16.

The values in Table 1 are in part(s) by mass.
(Production Conditions for Hard Coat Layer)

Production condition A: drying at 70° C., one minute, cumulative UV dose 200 mJ/cm$^2$ Production condition B: drying at 70° C., one minute, cumulative UV dose 500 mJ/cm$^2$ The following substrate films were used in the examples.

TAC80: TD80ULP available from Fujifilm Corporation, thickness 80 μm, triacetylcellulose substrate TAC40: KC4UA available from Konica Minolta, Inc., thickness 40 μm, triacetylcellulose substrate PET50: available from Toray Industries Inc., thickness 50 μm, polyethylene terephthalate substrate
(Production Conditions for Dry Film Layer)

Production condition a: The hard coat layer is surface-treated by glow discharge treatment at a treatment intensity of 2100 W·min/m$^2$. After glow discharge treatment, a 10-nm-thick adhesive layer containing SiO$_x$ is formed by sputtering. On the adhesive layer was formed a AR layer including a Nb$_2$O$_5$ film, a SiO$_2$ film, a Nb$_2$O$_5$ film, and a SiO$_2$ film, whereby a five-layered dry film layer is formed on the hard coat layer.

Production condition b: A dry film layer is formed on the hard coat layer as in Production condition a except that the treatment intensity of the glow discharge treatment is changed to 830 W·min/m$^2$.

Production condition c: A dry film layer is formed on the hard coat layer as in Production condition a except that the treatment intensity of the glow discharge treatment is changed to 420 W·min/m$^2$.

TABLE 1

|  |  |  | HC1 | HC2 | HC3 | HC4 | HC5 | HC6 | HC7 | HC8 | HC9 |
|---|---|---|---|---|---|---|---|---|---|---|---|
| Urethane acrylate | Shin-Nakamura Chemical Co., Ltd. U-6LPA | Solids content 100% | 15 | 20 | 10 | 15 | 20 | 15 | 15 | 15 | 15 |
| PETA | Nippon Kayaku Co., Ltd. PET30 | Solids content 100% | 20 | 30 | 20 |  | 25 | 20 | 20 | 20 | 20 |
| TMPTA |  | Solids content 100% |  |  |  | 20 |  |  |  |  |  |
| Polyethylene glycol diacrylate | Shin-Nakamura Chemical Co., Ltd. A600 | Solids content 100% | 15 | 20 | 10 | 15 | 5 | 15 | 15 | 15 | 15 |
| Silica particles | IPASTL Nissan Chemical Corporation 44 nm | Solids content 30% (IPA) | 167 | 100 | 200 | 167 | 167 |  | 167 | 167 | 167 |
| Silica particles | MIBKSDML Nissan Chemical Corporation 20 nm | Solids content 30% (MIBK) |  |  |  |  |  | 167 |  |  |  |

TABLE 1-continued

| | | | | | | | | | | | |
|---|---|---|---|---|---|---|---|---|---|---|---|
| PGME | | | 40 | 40 | 25 | 40 | 40 | 40 | 40 | 40 | 40 |
| Anone | | | 30 | 30 | 20 | 30 | 30 | 30 | 30 | 30 | 30 |
| MEK | | | | | | | | | | | |
| ESACURE ONE | | Solids content 100% | 3 | 3 | | 3 | 3 | 3 | 3 | 3 | 3 |
| Silicone type leveling agent | BYK377 | Solids content 100% | 0.03 | 0.03 | | 0.03 | 0.03 | 0.03 | 0.03 | 0.03 | 0.03 |
| Silane coupling agent 1 | Shin-Etsu Chemical Co., Ltd. KR513 | Solids content 100% | 3 | 3 | 3 | 3 | 3 | 3 | 5 | 9 | 3 |
| Silane coupling agent 2 | Shin-Etsu Chemical Co., Ltd. X121250 | Solids content 100% | | | | | | | | | |
| UVA1 | BASF TINUVIN 477 | Solids content 100% | | | | | | | | | |
| UVA2 | Adeka Corporation ADEKA STAB LA35 | Solids content 100% | | | | | | | | | |

| | | | HC10 | HC11 | HC12 | HC13 | HC14 | HC15 | HC16 |
|---|---|---|---|---|---|---|---|---|---|
| Urethane acrylate | Shin-Nakamura Chemical Co., Ltd. U-6LPA | Solids content 100% | 15 | 15 | 15 | 15 | 15 | 15 | 15 |
| PETA | Nippon Kayaku Co., Ltd. PET30 | Solids content 100% | 20 | 20 | 20 | 20 | 20 | 20 | 20 |
| TMPTA | | Solids content 100% | | | | | | | |
| Polyethylene glycol diacrylate | Shin-Nakamura Chemical Co., Ltd. A600 | Solids content 100% | 15 | 15 | 15 | 15 | 15 | 15 | 15 |
| Silica particles | IPASTL Nissan Chemical Corporation 44 nm | Solids content 30% (IPA) | 167 | 167 | 167 | 167 | 167 | 167 | 167 |
| Silica particles | MIBKSDML Nissan Chemical Corporation 20 nm | Solids content 30% (MIBK) | | | | | | | |
| PGME | | | 40 | 40 | 40 | 40 | 40 | 40 | 40 |
| Anone | | | 30 | 30 | 30 | 30 | 30 | 30 | 10 |
| MEK | | | | | | | | | 20 |
| ESACURE ONE | | Solids content 100% | 3 | 3 | 3 | 3 | 3 | 3 | 3 |
| Silicone type leveling agent | BYK377 | Solids content 100% | 0.03 | 0.03 | 0.03 | 0.03 | 0.03 | 0.03 | 0.03 |
| Silane coupling agent 1 | Shin-Etsu Chemical Co., Ltd. KR513 | Solids content 100% | | 3 | 3 | 3 | 3 | 5 | 3 |
| Silane coupling agent 2 | Shin-Etsu Chemical Co., Ltd. X121250 | Solids content 100% | 5 | | | | | | |
| UVA1 | BASF TINUVIN 477 | Solids content 100% | | 1 | 2 | 0.5 | | 1 | |
| UVA2 | Adeka Corporation ADEKA STAB LA35 | Solids content 100% | | | | | 3 | | |

Example 1

TAC80 was used as a substrate film. HC1 was applied onto the substrate film with a bar coater. HC1 was then dried and cured under Production condition A to give a 6-μm-thick hard coat layer.

Next, a dry film layer was formed on the hard coat layer under Production condition a.

Table 2 shows the arithmetic average roughness Ra in a micro field of view (1 μm×1 μm) on the surface of the hard coat layer, the average inter-projection distance of the projections and depressions and the standard deviation, and the average silica fine particle abundance in a cross section of the thickness direction of the hard coat layer and the standard deviation in Example 1. The arithmetic average roughness Ra in the micro field of view (1 μm×1 μm) was determined using SPM-9600, available from Shimadzu Corp., a scanning probe microscope (SPM) by the method described above. Similarly, the average inter-projection distance of the projections and depressions and the standard deviation and the average silica fine particle abundance in the cross section of the thickness direction of the hard coat layer and the standard deviation were determined by the methods described above.

On the dry film layer was formed a 10-nm-thick antifouling layer containing an alkoxysilane compound having a perfluoropolyether group. Thus, an optical layered body was produced. The optical layered body had a reflectance of 0.5% or lower and a water contact angle of 110° or greater.

The following evaluations were performed on the obtained optical layered body. Table 2 shows the results.

(Sw Properties)

Steel wool (#0000) available from Bonstar Sales Co., Ltd was reciprocated 10 times on the surface of the antifouling layer of the obtained optical layered body at a predetermined frictional load (1000 g/cm$^2$). The state of scratches on the coating film after rubbing was visually observed and evaluated based on the following criteria.

Good: No scratch was found (0 scratches).
Fair: Few scratches were found (about 1 to 9 scratches).
Poor: Scratches were clearly visible (10 or more scratches or a band of a large number of scratches) or the coating film was peeled.

(Pencil Hardness)

The pencil hardness of the surface on which the antifouling layer was formed was determined using a test pencil in conformity with JIS 56006 by a pencil hardness evaluation method specified in JIS K5600-5-4(1999) at a load of 500 g and a speed of 1 mm/sec.

(Blocking)

Two optical layered bodies were produced and each cut to a size of 5 cm×5 cm. The optical layered bodies were stacked together with the substrate film side of one optical layered body facing the antifouling layer side of the other optical layered body. The optical layered bodies were kept in contact at a pressure of 3.0 kgf/cm at 50° C. for 30 hours, and then evaluated according to the following criteria.

Good: No adhesion occurred.
Poor: Adhesion occurred.

(Cross-Hatch Test)

A cross-hatch pattern of 100 squares (1 mm×1 mm) was formed on the surface of the optical layered body.

The initial surface state of the cross-hatched surface was observed and evaluated.

The alcohol wipe rubbing test below was performed, and then the state of the cross-hatched surface was observed and evaluated.

Further, a durability test was performed by putting the optical layered body in a xenon irradiation environment (xenon arc lamp, 7.5 kW) for 60 hours, and then the alcohol wipe rubbing test was performed. The state of the cross-hatched surface was then observed.

In the alcohol wipe rubbing test, wipe soaked with ethyl alcohol was pressed against the cross-hatched surface at a load of 250 g/cm$^2$ and reciprocated 500 times for a distance of 10 cm. The evaluation criteria were as follows.

Good: No separation occurred in the squares of the cross-hatch pattern.
Fair: Separation occurred in some of the squares of the cross-hatch pattern.
Poor: Separation occurred in all the squares of the cross-hatch pattern.

Examples 2 To 23

Optical layered bodies according to Examples 2 to 22 were produced as in Example 1 except that the compositions and the production conditions shown in Table 2 were used.

TABLE 2

| Example | 1 | 2 | 3 | 4 | 5 | 6 | 7 | 8 | 9 | 10 | 11 |
|---|---|---|---|---|---|---|---|---|---|---|---|
| Composition for hard coat layer | HC1 | HC1 | HC1 | HC2 | HC3 | HC4 | HC5 | HC6 | HC7 | HC8 | HC9 |
| Thickness (μm) | 6 | 10 | 4 | 6 | 6 | 6 | 6 | 6 | 6 | 6 | 6 |
| Hard coat layer production condition | A | A | A | A | A | A | A | A | A | A | A |
| Substrate film | TAC80 | TAC80 | TAC80 | TAC80 | TAC80 | TAC80 | TAC80 | TAC80 | TAC80 | TAC80 | TAC80 |
| Dry film layer production condition | a | a | a | a | a | a | a | a | a | a | a |
| Ra (nm) micro field of view | 2.8 | 3.2 | 2.5 | 3 | 4.9 | 2.5 | 3.5 | 2.8 | 3.2 | 3.3 | 3.5 |
| Average inter-projection distance (nm) | 46.7 | 56.1 | 84.1 | 46.7 | 93.5 | 45.5 | 74.8 | 65.4 | 46.7 | 74.8 | 37.4 |
| Inter-projection distance standard deviation | 20.4 | 23 | 23.5 | 25.7 | 19.9 | 22.4 | 34.7 | 32 | 24.8 | 30.2 | 15.8 |
| Average silica fine particle abundance (%) in cross section | 54.6 | 52.9 | 48.1 | 35.2 | 65.3 | 47.7 | 44.3 | 73 | 52.1 | 51.3 | 52.9 |
| Silica fine particle abundance in cross section standard deviation | 4.6 | 4.8 | 4.5 | 4.2 | 6.2 | 4.5 | 4.3 | 3.5 | 3.6 | 4.8 | 3.4 |
| SW properties 1 kg/cm$^2$ | Good | Good | Good | Good | Good | Good | Good | Good | Good | Good | Good |
| Pencil hardness | 3H | 4H | 3H | 3H | 3H | 3H | 3H | 3H | 3H | 3H | 3H |
| Blocking | Good | Good | Good | Good | Good | Good | Good | Good | Good | Good | Good |
| Cross-hatch test Initial state | Good | Good | Good | Good | Good | Good | Good | Good | Good | Good | Good |
| Cross-hatch test After alcohol wipe rubbing test | Good | Good | Good | Good | Good | Good | Good | Good | Good | Good | Good |

TABLE 2-continued

| | | | | | | | | | | | |
|---|---|---|---|---|---|---|---|---|---|---|---|
| After durability test | | Good | Good | Good | Good | Good | Good | Good | Good | Excellent | Excellent | Excellent |
| Silicon atom abundance A (%) | | 4.6 | 4.7 | 4.6 | 4.2 | 4.5 | 4.6 | 4.6 | 4.5 | 5.8 | 9.2 | 4.5 |

| Example | | 12 | 13 | 14 | 15 | 16 | 17 | 18 | 19 | 20 | 21 | 22 |
|---|---|---|---|---|---|---|---|---|---|---|---|---|
| Composition for hard coat layer | | HC10 | HC11 | HC12 | HC13 | HC14 | HC15 | HC16 | HC1 | HC1 | HC1 | HC1 |
| Thickness (μm) | | 6 | 6 | 6 | 6 | 6 | 6 | 6 | 6 | 6 | 6 | 6 |
| Hard coat layer production condition | | A | A | A | A | A | A | A | B | A | A | A |
| Substrate film | | TAC80 | TAC80 | TAC80 | TAC80 | TAC80 | TAC80 | TAC80 | TAC80 | TAC40 | PET50 | TAC80 |
| Dry film layer production condition | | a | a | a | a | b | a | c | a | a | a | b |
| Ra (nm) micro field of view | | 3.7 | 3.8 | 3.6 | 3.9 | 3.3 | 3.7 | 3.5 | 2.6 | 2.9 | 1.9 | 2.5 |
| Average inter-projection distance (nm) | | 93.5 | 56.1 | 72.5 | 46.8 | 67.5 | 56.8 | 37.4 | 112.8 | 78.4 | 66.3 | 55.1 |
| Inter-projection distance standard deviation | | 35.2 | 26.3 | 20.4 | 27 | 16.8 | 30.5 | 24.1 | 36.2 | 23.6 | 21.6 | 20.7 |
| Average silica fine particle abundance (%) in cross section | | 51.4 | 55.3 | 54.6 | 51.6 | 49 | 49.3 | 46.9 | 48.3 | 43.4 | 53.2 | 48.6 |
| Silica fine particle abundance in cross section standard deviation | | 4.1 | 3.7 | 3.4 | 4 | 3.5 | 3.3 | 4.6 | 4.6 | 4.5 | 4.1 | 4.8 |
| SW properties 1 kg/cm² | | Good | Good | Good | Good | Good | Good | Good | Good | Good | Good | Good |
| Pencil hardness | | 3H | 3H | 3H | 3H | 3H | 3H | 3H | 3H | 3H | 3H | 3H |
| Blocking | | Good | Good | Good | Good | Good | Good | Good | Good | Good | Good | Good |
| Cross-hatch test | Initial state | Good | Good | Good | Good | Good | Good | Good | Good | Good | Good | Good |
| | After alcohol wipe rubbing test | Good | Good | Good | Good | Good | Good | Good | Good | Good | Good | Good |
| | After durability test | Excellent | Excellent | Excellent | Excellent | Excellent | Excellent | Good | Good | Good | Good | Good |
| Silicon atom abundance A (%) | | 6 | 4.5 | 4.7 | 4.7 | 4.6 | 5.7 | 4.5 | 4.6 | 4.7 | 4.5 | 4.6 |

(Preparation of Composition of Hard Coat Layer Formation)

The materials shown in Table 3 below were uniformly mixed with a paint shaker to prepare compositions for hard coat layer formation HC(A) to HC(I).

The values in Table 3 are in part(s) by mass.

TABLE 3

| | | | HC (A) | HC (B) | HC (C) | HC (D) | HC (E) | HC (F) | HC (G) | HC (H) | HC (I) |
|---|---|---|---|---|---|---|---|---|---|---|---|
| Urethane acrylate | Shin-Nakamura Chemical Co., Ltd. U-6LPA | Solids content 100% | 30 | 5 | 25 | 15 | 15 | 15 | 15 | 15 | 30 |
| PETA | Nippon Kayaku Co., Ltd. PET30 | Solids content 100% | 40 | 15 | 45 | | 20 | 20 | 20 | 20 | 40 |
| TMPTA | | Solids content 100% | | | | 20 | | | | | |
| Polyethylene glycol diacrylate | Shin-Nakamura Chemical Co., Ltd. A600 | Solids content 100% | 30 | 5 | 25 | 15 | 15 | 15 | 15 | 15 | 30 |
| Silica particles | IPASTL Nissan Chemical Corporation 44 nm | Solids content 30% (IPA) | 0 | 250 | 16 | | 167 | 167 | 167 | 167 | 0 |
| Silica particles | E65 CIK Nano Tek Corporation 150 nm | Solids content 15% (MIBK) | | | | 333 | | | | | |
| PGME | | | 40 | 5 | 25 | 4 | 40 | 40 | 40 | 1 | 40 |
| Anone | | | 30 | 5 | 20 | 4 | 30 | 30 | 30 | 1 | 30 |
| MEK | | | | | | | | | | 200 | |

TABLE 3-continued

|  |  |  | HC (A) | HC (B) | HC (C) | HC (D) | HC (E) | HC (F) | HC (G) | HC (H) | HC (I) |
|---|---|---|---|---|---|---|---|---|---|---|---|
| Irg 184 |  | Solids content 100% | 3 | 3 |  | 3 | 3 | 3 | 3 | 3 | 3 |
| Silicone type leveling agent | BYK377 | Solids content 100% | 0.03 | 0.03 |  | 0.03 | 0.03 | 0.03 | 0.03 | 0.0001 | 0.03 |
| Silane coupling agent 1 | Shin-Etsu Chemical Co., Ltd. KR513 | Solids content 100% | 3 | 3 | 3 | 3 | 3 | 20 | 3 | 3 | 0 |
| UVA1 | BASF TINUVIN 477 | Solids content 100% |  |  |  |  | 12 |  |  |  |  |

Comparative Examples 1 to 9 and Reference Examples 1 to 4

Optical layered bodies according to Comparative Examples 1 to 9 and Reference Examples 1 to 4 were produced as in Example 1 except that the compositions and production conditions were changed as shown in Table 4.

In Comparative Example 7, the optical layered body was produced as in Example 1 except that the dry film layer was formed without glow discharge treatment. In Comparative Example 8, instead of the dry film, a coating film was formed on the hard coat layer using a composition for an anti-reflection layer having the composition below. The coating film was dried and then cured with UV irradiation, whereby an anti-reflection layer (WetAR) having a thickness of 102 nm and a refractive index of 1.30 was formed under wet conditions.

(Composition for an Anti-Reflection Layer)
Pentaerythritol triacrylate (PETA): 0.015 parts by mass
Hollow silica particles (average particle size 60 nm): 0.16 parts by mass
Solid silica particles (average particle size 12 nm): 0.015 parts by mass
Fluorine-containing polymer: 0.6 parts by mass
Fluorine-containing monomer: 0.06 parts by mass
Photopolymerization initiator IRGACURE 127: 0.008 parts by mass
Methyl isobutyl ketone: 9.7 parts by mass

TABLE 4

|  |  | Comparative Example | | | | | | | | |
|---|---|---|---|---|---|---|---|---|---|---|
|  |  | 1 | 2 | 3 | 4 | 5 | 6 | 7 | 8 | 9 |
| Composition for hard coat layer |  | HC (A) | HC (B) | HC (C) | HC (D) | HC (F) | HC (H) | HC1 | HC1 | HC (I) |
| Thickness (μm) |  | 6 | 6 | 6 | 6 | 6 | 6 | 6 | 6 | 6 |
| Hard coat layer production condition |  | A | A | A | A | A | A | A | A | A |
| Substrate film |  | TAC80 | TAC80 | TAC80 | TAC80 | TAC80 | TAC80 | TAC80 | TAC80 | TAC80 |
| Dry film layer production condition |  | a | a | a | a | a | a | No glow discharge treatment | WetLR | a |
| Ra (nm) micro field of view |  | 0.3 | 8.3 | 0.3 | 22 | 3.5 | 3.3 | 3.3 | 3.4 | 0.3 |
| Average inter-projection distance (nm) |  | — | 93.3 | 108.5 | 242.4 | 60.7 | 151.5 | 38.3 | 47.9 | — |
| Inter-projection distance standard deviation |  | — | 55.3 | 116.6 | 71 | 28.2 | 105.8 | 25.1 | 23.7 | — |
| Average silica fine particle abundance (%) in cross section |  | 0 | 88.9 | 4 | 83.1 | 52.1 | 51.3 | 49.4 | 52.8 | 0 |
| Silica fine particle abundance in cross section standard deviation |  | — | 7.6 | 12 | 8.5 | 6.2 | 7.5 | 4.9 | 5.3 | — |
| SW properties |  | Good | Poor | Good | Poor | Good | Good | Poor | Poor | Fair |
| Pencil hardness |  | 2H | H | 2H | H | B | 3H | 3H | 3H | 2H |
| Blocking |  | Poor | Good | Poor | Good | Good | Good | Good | Good | Poor |
| Cross-hatch test | Initial state | Poor | Poor | Poor | Poor | Good | Poor | Poor | Good | Poor |
|  | After alcohol wipe rubbing test | Poor | Poor | Poor | Poor | Good | Poor | Poor | Good | Poor |
|  | After durability test | Poor | Poor | Poor | Poor | Good | Poor | Poor | Good | Poor |
| Silicon atom abundance A (%) |  | 2.2 | 14 | 2.5 | 5.1 | 12 | 5 | 4.5 | 4.7 | 0.1 |

|  | Reference Example 1 | Reference Example 2 | Reference Example 3 | Reference Example 4 |
|---|---|---|---|---|
| Composition for hard coat layer | HC (E) | HC (G) | HC1 | HC1 |
| Thickness (μm) | 6 | 6 | 1 | 25 |
| Hard coat layer production condition | A | A | A | A |
| Substrate film | TAC80 | TAC80 | TAC80 | TAC80 |
| Dry film layer production condition | a | a | a | a |
| Ra (nm) micro field of view | 2.6 | 13 | 3.2 | 2.7 |
| Average inter-projection distance (nm) | 46.1 | 53.9 | 84.1 | 76.4 |
| Inter-projection distance standard deviation | 36.4 | 25 | 34.4 | 24.6 |
| Average silica fine particle abundance (%) in cross section | 49.5 | 58.9 | 47.4 | 48.2 |
| Silica fine particle abundance in cross section standard deviation | 5.8 | 6.7 | 5.7 | 5.3 |

TABLE 4-continued

| | | | | | |
|---|---|---|---|---|---|
| SW properties | | Good | Good | Good | Fair |
| Pencil hardness | | B | 3H | B | 5H |
| Blocking | | Good | Good | Good | Good |
| Cross-hatch | Initial state | Good | Poor | Good | Fair |
| test | After alcohol wipe rubbing test | Good | Poor | Good | Fair |
| | After durability test | Good | Poor | Good | Fair |
| Silicon atom abundance A (%) | | 5.6 | 5.7 | 4.4 | 4.6 |

Tables 2 and 4 show that the optical layered bodies according to the examples had excellent interlayer adhesiveness, particularly even after the durability test simulating outdoor use, and also had highly excellent anti-blocking properties. In addition, the arithmetic average roughness Ra in the macro field of view (0.12 mm×0.12 mm) in the examples was 0.5 to 7.0 nm, and smoothness advantageous for the dry film layer formation was also maintained.

In contrast, none of the optical layered bodies according to the comparative examples were excellent in all of the interlayer adhesiveness, particularly interlayer adhesiveness after the durability test simulating outdoor use, and anti-blocking properties. In the optical layered body according to Comparative Example 7, silica fine particles were not exposed on the surface of the hard coat layer because the glow discharge treatment was not performed. The optical layered body thus had low SW properties and low interlayer adhesiveness.

The optical layered body according to Reference Example 1 had a high ultraviolet absorber content and thus had a low pencil hardness. The optical layered body according to Reference Example 2 had a high MEK content, so that an increased amount of binder resin permeated the substrate film, resulting in a high arithmetic average roughness Ra in the micro field of view and the macro field of view. The optical layered body also had low interlayer adhesiveness. The optical layered body according to Reference Example 3 had a thin hard coat layer and thus had a low pencil hardness. The optical layered body according to Reference Example 4 had a thick hard coat layer and thus had low SW properties and low interlayer adhesiveness.

INDUSTRIAL APPLICABILITY

The optical layered body of the present invention has excellent interlayer adhesiveness, particularly even in outdoor use, and also has excellent anti-blocking properties. The optical layered body is thus can be used in image display devices.

The invention claimed is:

1. An optical layered body comprising:
a substrate film;
a hard coat layer containing silica fine particles on at least one surface of the substrate film; and
a dry film layer on a surface of the hard coat layer opposite to the substrate film side surface of the hard coat layer,
wherein the silica fine particles are exposed on the dry film layer side surface of the hard coat layer;
the dry film layer is directly formed on the surface of the hard coat layer on which the silica fine particles are exposed;
the hard coat layer before the formation of the dry film layer has projections and depressions on the surface on which the dry film layer is to be formed;
the hard coat layer has an average silica fine particle abundance in ten 0.2 μm×0.2 μm regions of 30 to 80% and a standard deviation of silica fine particle abundances in the 10 regions of 1 to 7, where the 10 regions are randomly selected from a cross section of the hard coat layer in the thickness direction within the range from the dry film layer side interface to 10% of the thickness in the thickness direction; and
the hard coat layer has a silicon atom abundance A of 3 to 10% on the surface opposite to the substrate film side surface as determined by X-ray photoelectron spectroscopy.

2. The optical layered body according to claim 1,
wherein the hard coat layer before the formation of the dry film layer has, on the surface on which the dry film layer is to be formed, an arithmetic average roughness Ra of the projections and depressions of 0.5 to 7.0 nm as determined in a 1 μm×1 μm measurement field of view, has an average inter-projection distance of the projections and depressions of 10 to 150 nm and a standard deviation of inter-projection distances of the projections and depressions of 40 nm or smaller, and have an arithmetic average roughness Ra of the projections and depressions of 0.5 to 7.0 nm as determined in a 0.12 mm×0.12 mm measurement field of view.

3. The optical layered body according to claim 1,
wherein the hard coat layer contains at least one selected from the group consisting of a silicon atom-containing organic compound and an ultraviolet absorber.

4. The optical layered body according to claim 3,
wherein the silicon atom-containing organic compound is a reactive silicon atom-containing organic compound.

5. The optical layered body according to claim 3,
wherein the ultraviolet absorber is a monomer-type ultraviolet absorber having a weight average molecular weight of 220 to 1100.

6. The optical layered body according to claim 1,
wherein the dry film layer includes a total of four or more alternately stacked high refractive index layers and low refractive index layers, the high refractive index layers having a refractive index of 2.2 to 2.4 and the low refractive index layers having a refractive index of 1.43 to 1.53.

* * * * *